United States Patent [19]

Senn

[11] Patent Number: 4,783,226

[45] Date of Patent: Nov. 8, 1988

[54] METHOD AND APPARATUS FOR TREATING CABLES

[76] Inventor: William R. Senn, Rte. 2, Box 26, Shongaloo, La. 71072

[21] Appl. No.: 79,510

[22] Filed: Jul. 30, 1987

[51] Int. Cl.$^4$ .............................................. H01B 13/06
[52] U.S. Cl. ......................................... 156/48; 118/65; 156/94; 174/23 R; 427/117; 427/235; 427/238
[58] Field of Search ...................................... 118/63–65, 118/DIG. 22; 156/48, 94; 427/117, 235, 238; 174/23 R

[56] References Cited

U.S. PATENT DOCUMENTS

| | | | |
|---|---|---|---|
| 3,252,834 | 5/1966 | Vincent | 156/48 X |
| 3,823,250 | 7/1974 | DeMonsy et al. | 156/48 X |
| 3,939,882 | 2/1976 | Gillemot | 156/48 X |
| 4,075,267 | 2/1978 | Florer | 156/48 X |

Primary Examiner—Robert A. Dawson
Attorney, Agent, or Firm—John M. Harrison

[57] ABSTRACT

An apparatus for treating air core cables such as air core plastic insulated telephone cables, which includes a treatment tank provided with air and liquid application piping; an air application saddle or fitting and at least one liquid application saddle or fitting applied to the telphone cable in spaced relationship, with air and liquid application connections extending from the saddles; and a cable block sealing a segment of the air core cable to be treated. Air and liquid are applied in sequence to the plastic insulated cable pairs located in the cable, in order to clear water and other fluids from the cable and restore electrical transmission through the cable pairs. A method for treating air core cables such as air core plastic insulated telephone cables, which includes the steps of blocking the cable to isolate one segment of the cable, cutting spaced windows in the cable segment, applying an air application saddle and at least one liquid application saddle in spaced relationship over the windows, forcing air through the air application saddle and the cable to clear water from the cable, pumping a treatment liquid through the liquid saddle to restore the plastic insulated cable pairs and forcing more air through the cable segment to dry the cable pairs.

14 Claims, 1 Drawing Sheet

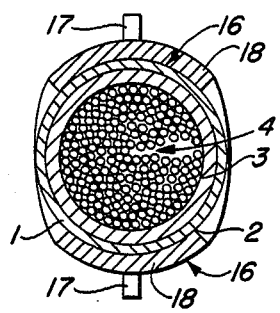
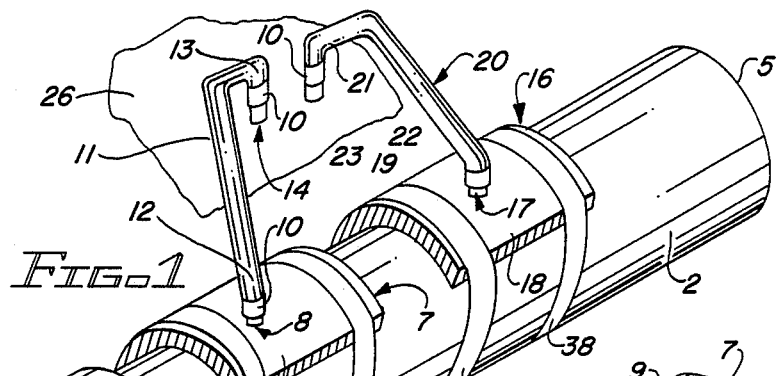
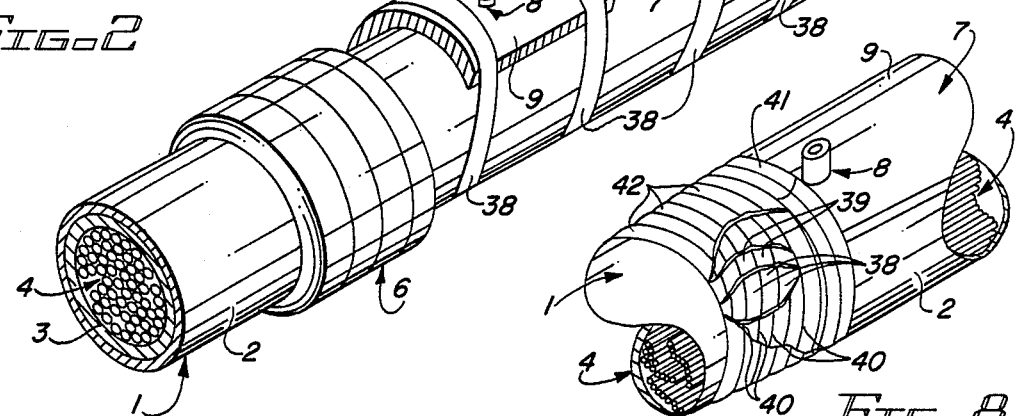
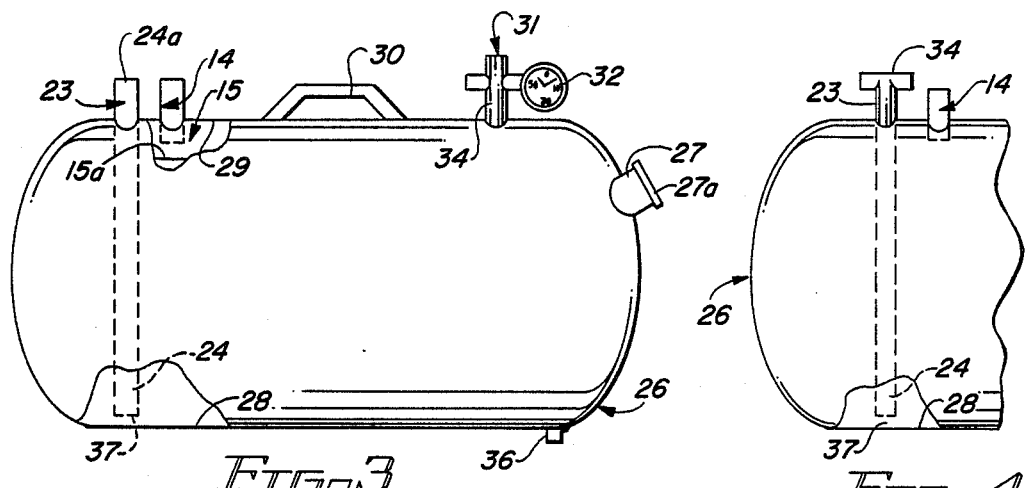
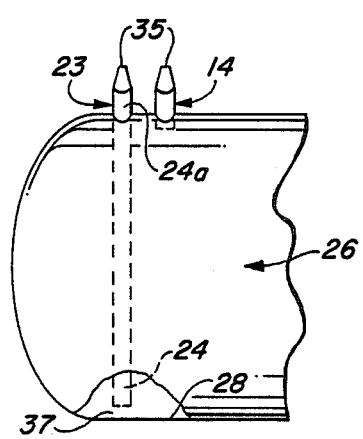
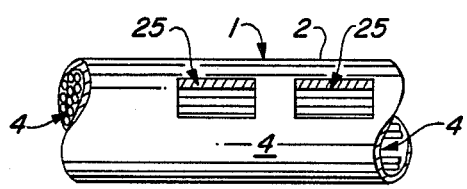

METHOD AND APPARATUS FOR TREATING CABLES

BACKGROUND OF THE INVENTION

1. Field of the Invention

This invention relates to the maintenance of air core cables such as air core plastic insulated telephone cables and more particularly, to a method and apparatus for treating air core cables. The apparatus of this invention includes a treatment tank for containing a treatment liquid, with an air space provided between the surface of the liquid and the top of the tank, a cable block applied to a segment of the cable, in order to isolate a length of the cable to be treated and an air application fitting and at least one liquid application fitting applied to the cable in spaced relationship over windows cut in the cable, for introducing air and liquid into the cable and treating the cable pairs inside the cable. The method of this invention includes the steps of isolating a segment of cable to be treated by blocking one end of the segment to be treated, cutting a pair of spaced windows in the cable and applying an air application fitting to one of the windows and a liquid application fitting to the other window, and pumping air and liquid in sequence from the treatment tank through the air application fitting and the liquid application fitting, respectively, to treat the cable pairs in the air core of the cable.

2. Description of the Prior Art

One of the problems realized in maintaining the many miles of air core cables such as air core plastic insulated telephone cables which have been laid over the years, is that of water intrusion, corrosion and galvanic action which takes place due to the presence of dissimilar metals in the cables. These actions produce undesirable electrical shorting of the cable pairs in the cable core and cause noise, interference and cross-telephone conversations in telephone lines which are served by the cable. Various techniques have been used to alleviate this problem, including the pumping of liquids and gases such as air and nitrogen through the cable to clear the cable of water and dry the telephone cable pairs. Various types of compounds such as copper sulfate and sulfuric acid are also formed in the cables and water intrusion changes the capacitance of the cable, which increases the noise level in telephone conversations. This problem is further complicated by the fact that many air core cables include a plastic outer sheath, an intermediate liner constructed of a metal such as copper, aluminum or steel metal and an optional plastic inner sheath, which contains the cable pairs. Under circumstances where the inner plastic sheath is worn, pitted or otherwise damaged to facilitate water intrusion to the metal jacket, or where no plastic inner sheath is placed in the cable, the copper, aluminum or steel oxidizes and forms compounds which are detrimental to the life and service of the cable pairs located in the air core cable.

Accordingly, it is an object of this invention to provide a new and improved method and apparatus for cleaning and treating air core cables and air core plastic insulated telephone cables in particular, to eliminate or minimize shorts, crosses and grounds in the cable pairs and to shield against galvanic action.

Another object of this invention is to provide a new and improved method and apparatus for treating air core plastic insulated telephone cables by removing water and moisture from the cables and cleaning the cables and sheaths of conductive corrosion which interferes with the transmission of electric current through the cable pairs.

Yet another object of this invention is to provide a method and apparatus for treating air core plastic insulated telephone cables to seal pin holes in the cable sheaths, prevent further intrusion of water into the cables and renew the flexibility of the insulation, as well as to reinsulate bare spots in the cable pairs which are caused by corrosion.

Still another object of the invention is to provide a new and improved method and apparatus for treating and internally repairing air core telephone cables of substantially any size along a cable path of up to about 1200 feet, including air core telephone cables characterized by non-filled splices.

Yet another object of the invention is to provide a method and apparatus for treating air core cables such as air core plastic insulated telephone cables with air or nitrogen in a first step and a low viscosity, light demoisturizing insulating and cleaning oil as a treating agent, in a second step.

Still another object of the invention is to provide a new and improved method and apparatus for treating air core telephone cables, which method and apparatus is cost-effective and can be accomplished for about one-fifth of the replacement cost of the cable.

SUMMARY OF THE INVENTION

These and other objects of the invention are provided in a new and improved method and apparatus for cleaning and treating air core cables such as air core plastic insulated telephone cables, including toll and trunk cables, to reduce hearing loss and noise levels in the telephone system, which apparatus includes a specially designed treatment tank for containing a treatment liquid and air or an inert gas, an air application fitting and liquid application fitting provided on a blocked segment of the cable to be treated and a pump for pumping air and liquid through the air application fitting and the liquid application fitting, respectively, to clear the cable of water and moisture, and treat the cable pairs in the cable.

BRIEF DESCRIPTION OF THE DRAWING

The invention will be better understood by reference to the accompanying drawing, wherein:

FIG. 1 is a perspective view of a segment of air core cable to be treated, further illustrating a cable block and an air application fitting and liquid application fitting located in functional position for treating the cable;

FIG. 2 is a sectional view of an alternative preferred embodiment, wherein a pair of liquid application valves are provided for treating an air core cable having at least 400 cable pairs;

FIG. 3 is a side view of a preferred treatment tank for containing treatment liquid;

FIG. 4 is a sectional view of alternative air application pipe and liquid application pipe fittings for the treatment tank illustrated in FIG. 3;

FIG. 5 is a sectional view of second alternative air application pipe and liquid application pipe configurations;

FIG. 6 is a side elevation of a typical air and liquid flexible hose used to connect the saddle air nipple from the air application fitting to the air application pipe on the treatment tank;

FIG. 7 is a section of the air core cable illustrated in FIG. 1, with a pair of windows cut in the outer sheath and cable wall and communicating with the cable pairs for application of the air application fitting and liquid application fitting illustrated in FIG. 1; and FIG. 8 is a section of the air core cable illustrated in FIG. 1, more particularly illustrating a preferred sequence of taping the air application fitting to the cable.

DESCRIPTION OF THE PREFERRED EMBODIMENTS

Referring initially to FIGS. 1 and 7 of the drawing a section of air core plastic insulated telephone cable, herein designated as air core cable, is generally illustrated by reference numeral 1. The air core cable 1 is blocked at a designated point by a cable block 6 in conventional fashion, to define a treatment segment which is open at the open end 5. The cable block 6 is applied to the appropriate point on the air core cable 1 by injecting a suitable blocking compound such as "Scotchcast 4407 Encapsulating and Blocking Compound", a product manufactured by the 3M Company, through openings cut in the outer sheath 2 and the inner sheath 3, to block the air core between the cable pairs 4 which extend throughout the length of the air core cable 1, as illustrated in FIG. 1. Other types of "blocks" which may be used for isolating a specific segment of the air core cable 1 to be cleaned and treated, are the "moisture block", "wrapped block" and "in-sheath pressure block", in addition to the injected block noted above. The cable block 6 is first effected at the desired location in the air core cable 1 by well known techniques, according to the knowledge of those skilled in the art. After the cable block 6 is securely in place, the air core cable 1 is prepared for installation of an air application fitting 7 and at least one liquid application fitting 16, as illustrated in FIG. 1, by cutting a pair of windows 25 in spaced relationship through the outer sheath 2 and the inner sheath 3 of the air core cable 1, as illustrated in FIG. 7. The windows 25 communicate with the air core inside the air core cable 1 and with the cable pairs 4, in order to facilitate the injection of air or an inert gas such as nitrogen, as well as a liquid treating solution through the windows 25 and into the air core cable 1, as hereinafter further described. When the cable block 6 has sufficiently cured and the windows 25 are cut in the air core cable 1 in spaced relationship, the area on the outer sheath 2 surrounding the windows 25 is then cleaned with a solvent and is scoffed to abrade the surface of the outer sheath 2. A cement such as a black rubber cement is then painted around the windows 25 and allowed to dry until "tacky" to the touch. This technique prepares the air core cable 1 for a "pressure wrap" installation, as follows. An air application fitting 7, such as the injection pressure fitting identified as the "Scotchcast 4475" fitting is then applied to the first of the windows 25 which is closest to the cable block 6, by placing the air saddle 9 on top of the black rubber cement coated area adjacent the windows 25, with the saddle air nipple 8 projecting upwardly and communicating with the window 25, as illustrated in FIG. 1. A strip of ¾ inch D.R. waterproof splicing tape 38 is then wrapped around both edges of the air saddle 9 and around the outer sheath 2 of the air core cable 1, to secure the air saddle 9 tightly against that portion of the outer sheath 2 which surrounds the first of the windows 25. A D.R. waterproof splicing tape which is suitable for this application is the "TL-192 Rubber Splicing" tape manufactured by Plymouth Rubber Company, Inc., of Canton, Mass. A double half-lapped wrap of the D.R. tape 38 is then completed around and over the air saddle 9 and the outer sheath 2 of the air core cable 1, to further secure the air application valve 7 to the first of the two windows 25. In like manner, the liquid saddle 18 of the liquid application fitting 16 is seated over the remaining area of the outer sheath 2 which is coated with black rubber cement around the second of the two windows 25, with the saddle liquid nipple 17 upward-standing from the liquid saddle 18 and communicating with the underlying window 25. The liquid application fitting 16 may also be characterized by a "Scotchcast 4475" fitting, or an equivalent fitting, as desired. Two strips of D.R. tape 38 are then wound around the liquid saddle 18 near the edges thereof, in order to secure the liquid saddle 18 tightly over the second of the two windows 25, as further illustrated in FIG. 1. A double half-wrap of ¾ inch D.R. tape 38 is then applied to the entire liquid saddle 18 to further secure the liquid application fitting 16 in position over the second of the two windows 25.

Referring now to FIGS. 1 and 8 of the drawing, a double half-lapped wrap of aluminum tape 39 is then wrapped over the D.R. tape 38, with the half-lapped wrap extending at least one-half an inch beyond the D.R. tape 38 on either end of the wrap. The aluminum tape 39 is then smoothed with a smooth object such as a hammer handle, to conform it to the D.R. tape 38 wrap. The aluminum tape 39 is typically characterized by "Aluminum Foil Pressure-Sensitive Tape 49" manufactured by the 3M Company and serves to provide an effective moisture barrier over the air saddle 9 and the liquid saddle 18. A single layer of polyglass tape 40 is then half-lapped over the aluminum tape 39, to extend at least one-half inch beyond the aluminum tape 39. The polyglass tape 40 is characterized by the "Scotch Brand 27 Glass Cloth-Backed Electrical Tape" and incorporates great strength at variable temperature in sealing the air saddle 9 and liquid saddle 18 to the air core cable 1. A pair of hose clamps 41 are then applied on each side of the saddle air nipple 8 and the saddle liquid nipple 17 of the air application fitting 7 and the liquid application fitting 16, respectively, as illustrated in FIG. 8, to further secure the air saddle 9 and the liquid saddle 18 tightly over the respective windows 25. Nipple caps (not illustrated) are then threadibly secured to the projecting, threaded saddle air nipple 8 and the saddle liquid nipple 17 to protect the threads (not illustrated) thereon. A final half-lapped layer of vinyl plastic tape 42 is then wrapped over the previously applied polyglass tape 40 and the hose clamps 41, to cover all areas of the air application fitting 7 and liquid application fitting 16 installations except the saddle air nipple 8 and the saddle liquid nipple 17. The vinyl plastic tape 42 is typically the "No. 88T All Weather Telephone Vinyl Plastic Tape" manufactured by the 3M Company.

Referring now to FIGS. 1, 3, 5 and 6 of the drawing, a desired quantity of treatment liquid is poured into the treatment tank 26 through the filler neck 27, leaving an air space 15 between the surface 15a of the treatment liquid and the tank top 29 of the treatment tank 26. In a most preferred embodiment of the invention the filler neck 27 is located on one end of the treatment tank 26 at a level which determines the liquid level, or surface 15a, and hence the size of the air space 15, in the treatment tank 26. An air application pipe 14 extends through the tank top 29 and terminates in the air space 15 between the surface 15a of the treatment liquid and the tank top 29. The suction end 24 of a companion liquid application pipe 23 extends in close proximity to the tank bottom 28 of the treatment tank 26, leaving an intake space 37 between the suction end 24 and the tank bottom 28, as illustrated in FIGS. 3-5. The discharge end 24a of the liquid application pipe 23 projects through the top of the tank top 29 in parallel, spaced relationship with respect to the air application pipe 14, as illustrated. An air fitting 31 is welded or otherwise attached to the treatment tank 26 near the filler neck 27 and includes a tee leg 34 and a pressure gauge 32, for monitoring the pressure of an incoming gas, such as air, which is injected into the treatment tank 26 by a suitable compressor (not illustrated), or nitrogen, from a storage bottle, as hereinafter described. A handle 30 is provided intermediate the air application port 14 and the air fitting 31, for carrying the treatment tank 26 and a leg 36 is provided on one end of the treatment tank 26 beneath the filler neck 27, in order to facilitate tilting the treatment tank 26 such that small remaining volumes of treatment liquid will flow through the suction end 24 of the liquid application pipe 23 during the treatment phase of the process.

In operation, when it is desired to clear that segment of the air core cable 1 which extends between the cable block 6 and the open end 5 of water and other accumulation and treat the cable pairs 4, an air hose 11 is first extended between the treatment tank 26 and the air application fitting 7. The air nipple connectors 10, located on each end of the air hose 11, are then attached to the saddle air nipple 8 of the air saddle 9 and the air application pipe 14, extending from the treatment tank 26 at the air nipple end 12 and the air feed end 13, respectively. It will be appreciated that the air nipple connectors 10 may be each characterized by quick-disconnect fittings which are compatible with the hydraulic fitting 35 provided on the discharge end 24a of the liquid application pipe 23 and on the air application pipe 14, as illustrated in FIG. 5, or on such other fitting as may be compatible with the liquid application pipe 23, according to the knowledge of those skilled in the art. Furthermore, a liquid hose 20 is prepared for extension between the treatment tank 26 and the liquid application fitting 16, with the liquid nipple connector 19 located on the end of the liquid hose 20 which connects to the liquid application pipe 23, and the air nipple connector 10 adapted for securing to the saddle liquid nipple 17 in the liquid saddle 18. As in the case of the air nipple connectors 10, the liquid nipple connector 19 can be characterized by a quick-disconnect coupling or other coupling designed to engage the hydraulic fitting 35 located on the discharge end 24a of the liquid application pipe 23. When the air hose 11 is secured in position as illustrated in FIG. 1, and in a first embodiment, a cap (not illustrated) is threaded on the discharge end 24a of the liquid application pipe 23, the treatment tank is filled to the filler neck 27 with treatment liquid, the filler cap 27a is threaded on the filler neck 27 and nitrogen or air is supplied under pressure to the air fitting 31 by means of a pressurized bottle or a compressor (not illustrated). Alternatively, the self-sealing hydraulic fittings 35 illustrated in FIG. 5 may be used on the discharge end 24a of the liquid application pipe 23 and the air application pipe 14 and pressure in the treatment tank 26 need not be reduced. Air pressure normally not exceeding about 60 psig is then applied to the air space 15 between the surface 15a of the liquid and the tank top 29, with the air pressure monitored on the pressure gauge 32, located in the air fitting 31. Air is pumped into the air core cable 1 through the air hose 11 and operates to force water and other accumulated liquid from the air core cable 1. When the accumulated water and moisture have been substantially removed from the air core cable 1, the first stage of the method of this invention has been accomplished and the second stage is undertaken. The second or liquid treatment stage is then initiated by reducing the air pressure in the treatment tank 26, removing the cap from the discharge end 24a of the liquid application pipe 23 and connecting the liquid nipple end 22 of the liquid hose 20 to the saddle liquid nipple 17 by means of one of the liquid nipple connectors 19. The liquid feed end 21 of the liquid hose 20 is then connected to the liquid application pipe 23 by operation of the air nipple connector 10. The air hose 11 is then removed from connection to the saddle air nipple 8 and the air application pipe 14 and the air application pipe 14 is closed with the threaded cap (not illustrated). Air is again introduced into the treatment tank 26 at least 30 psig and air pressure forces the treatment liquid from the treatment tank 26 through the suction end 24 of the liquid application pipe 23 and the liquid hose 20 and through the air core cable 1 in a solid mass, and exits the air core cable 1 at the open end 5. As noted above, under circumstances where the self-sealing hydraulic fittings 35 are used on the liquid application pipe 23 and the air application pipe 14, the air pressure need not be reduced in the treatment tank 26 and the liquid hose 20 is connected to the saddle liquid nipple 17 and to the liquid application pipe 23 without using the cap. When the treatment liquid has completely drained from the treatment tank 26, air begins to flow through both the air application port 14 and the liquid application pipe 23 and the air causes a drying effect in the air core cable 1 and on the cable pairs 4 and serves to aid in coating the treatment liquid on the cable pairs 4. Since the treatment liquid coats the cable pairs 4 and the inside surface of the inner sheath 3 of the air core cable 1, the volume of liquid which exits the open end 5 of the air core cable 1 is less than that which was introduced into the treatment tank 26 and the air core cable 1. After the flow of liquid from the open end 5 of the air core cable 1 has ceased, the air pressure is maintained in a range of from about 30 to about 60 psig in the treatment tank 26 for a sufficient length of time necessary to observe that there is no liquid bubbling at the open end 5 of the air core cable 1. The air pressure should be maintained at at least 30 psig, since if the pressure drops below about 10 psig, the liquid treatment material will "pool" in the air core cable 1 and the treatment process must be repeated. It has been found that the liquid treatment material must flow through the air core cable 1 in a substantially solid wall or slug at least 100-150 ft. in length, in order to effectively coat the cable pairs 4 and treat the air core cable 1. When the bubbling of liquid treatment material is minimal at the open end 5 of the air core cable 1, the cable block 6, air application fitting 7 and the liquid application fitting 16 are removed from the air core cable 1 and the air core cable 1 is restored to its original condition.

As illustrated in FIG. 2 of the drawing, when the process and apparatus of this invention are used to treat an air core cable 1 having 400 or more cable pairs 4, an additional window (not illustrated) is cut into the air core cable 1 and an additional liquid application fitting 16 is taped to the air core cable beneath the first liquid application fitting 16 in the same manner as is illustrated in FIGS. 1 and 8. A pair of liquid hoses 20 are then connected to the tee leg 34 of the liquid application pipe 23, illustrated in FIG. 4, and to the respective saddle liquid nipples 17, when it is desired to pump treatment liquid into the air core cable 1. Otherwise, the treatment process is identical to the procedure outlined above.

It will be appreciated by those skilled in the art that the method and apparatus for treating air core cables of this invention provides a quick, efficient and cost-effective means for treating air core cables and air core plastic insulated telephone cables in particular. The method and apparatus disclosed herein is inexpensive, in that it requires approximately one-fifth the cost of replacing the cable and can be utilized to drastically reduce noise in the cable pairs existing in the air core cable.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. In an apparatus for treating air core cables wherein an air application saddle fitting and at least one liquid application saddle fitting are attached to the cable over windows provided in the cable and air and a treatment liquid are injected into the cable, the improvement in combination therewith comprising a treatment tank for containing a quantity of treatment liquid; a liquid application pipe extending through a top surface of said tank, with one end of said liquid application pipe projecting above said top surface of said tank and the opposite end of said liquid application pipe terminating in close proximity to the bottom of said tank; an air application pipe extending through said top surface of said tank, with one end of said air application pipe projecting above said top surface of said tank and the opposite end of said air application pipe terminating below said top surface of said tank and above the surface of the treatment liquid contained in the tank; air intake means provided in said top surface of said tank; first hose means adapted for connection to said liquid application saddle fitting and said liquid application pipe for transferring treatment liquid from said tank to the cable; and second hose means adapted for connection to said air application saddle fitting and said air application pipe for pressuring said tank and selectively applying air to the cable responsive to capping of said liquid application pipe and pressuring said tank in a first step, draining of treatment liquid from said tank and applying treatment liquid to the cable responsive to capping of said air application saddle fitting and pressuring said tank in a second step and continuing the flow of air into the cable for drying the cable, in a third step.

2. The apparatus of claim 1 further comprising a filler neck provided in one end of said tank beneath said top surface for introducing the treatment liquid into said tank and limiting the quantity of treatment liquid which can be introduced into said tank.

3. The apparatus of claim 1 further comprising a pressure gauge provided in said air intake means for indicating the air pressure inside said tank.

4. The apparatus of claim 1 further comprising:
   (a) a filler neck provided in one end of said tank beneath said top surface for introducing the treatment liquid into said tank and limiting the quantity of treatment liquid which can be introduced into said tank; and
   (b) a pressure gauge provided in said air intake means for indicating the air pressure inside said tank.

5. The apparatus of claim 1 further comprising first quick-disconnect coupling means provided on said one end of said liquid application pipe, said one end of said air application saddle pipe, on said air application fitting and on said liquid application saddle fitting and second quick-disconnect coupling means provided on the ends of said first hose means and said second hose means, respectively, for rapid attachment of said first hose means to said liquid application saddle fitting and said one end of said liquid application pipe and said second hose means to said air application saddle fitting and said one end of said air application pipe.

6. The apparatus of claim 5 further comprising a filler neck provided in one end of said tank beneath said top surface for introducing the treatment liquid into said tank and limiting the quantity of treatment liquid which can be introduced into said tank.

7. The apparatus of claim 6 further comprising a pressure gauge provided in said air intake means for indicating the air pressure inside said tank.

8. A method for treating an air core cable comprising the steps of filling a segment of the cable to create a cable block in the cable; providing two windows in the cable in spaced relationship from said cable block to expose the cable pairs inside the cable; attaching a liquid application saddle fitting to the cable over one of said windows; attaching an air application saddle fitting over the remaining one of said windows between said liquid application saddle fitting and said cable block; substantially filling a treatment tank having a liquid application pipe and an air application pipe with a treatment liquid, for injection into the cable; connecting a liquid hose to said liquid application saddle fitting and said liquid application pipe and blocking the air flow through said air application saddle fitting; injecting air into said tank and forcing the treatment liquid through said liquid application pipe, said liquid hose and said liquid application saddle fitting into the cable to coat the cable pairs; and continuing the flow of air into said tank and through the cable to substantially dry the liquid pairs after the treatment liquid is depleted from said tank.

9. The method according to claim 8 further comprising the step of blocking the liquid flow through said liquid application pipe and injecting air into said tank prior to injecting the treatment liquid into the cable to clear waste liquid from the cable.

10. The method according to claim 8 further comprising the step of providing a third window in the cable substantially beneath said liquid application saddle fitting and attaching an auxiliary liquid application saddle fitting on the cable over said third window, for injecting treatment liquid into the cable through said liquid application saddle fitting and said auxiliary application saddle fitting.

11. The method according to claim 8 further comprising the steps of:
   (a) blocking the liquid flow through said liquid application pipe and injecting air into said tank prior to injecting the treatment liquid into the cable to clear waste liquid from the cable; and
   (b) providing a third window in the cable substantially beneath said liquid application saddle fitting and attaching an auxiliary liquid application saddle fitting on the cable over said third window, for injecting treatment liquid into the cable through said liquid application saddle fitting and said auxiliary application saddle fitting.

12. The method according to claim 8 further comprising the step of sizing said liquid application pipe such that one end of said liquid application pipe projects above the top of said treatment tank and the opposite end of said liquid application pipe extends in close proximity to the inside bottom surface of said tank and sizing said air application pipe such that one end of said air application pipe projects above the top of said treatment tank and the opposite end of said air application pipe terminates inside said tank above the treatment liquid.

13. The method according to claim 12 further comprising the step of blocking the liquid flow through said liquid application pipe and injecting air into said tank prior to injecting the treatment liquid into the cable to clear waste liquid from the cable.

14. The method according to claim 13 further comprising the step of providing a third window in the cable substantially beneath said liquid application saddle fitting and attaching an auxiliary liquid application saddle fitting on the cable over said third window, for injecting treatment liquid into the cable through said liquid application saddle fitting and said auxiliary liquid application saddle fitting.

* * * * *